United States Patent
Lin et al.

(10) Patent No.: US 10,186,043 B2
(45) Date of Patent: Jan. 22, 2019

(54) METHOD AND APPARATUS FOR DETECTING MOVEMENT DIRECTION OF TARGET OBJECT

(71) Applicants: BEIJING KUANGSHI TECHNOLOGY CO., LTD., Beijing (CN); PINHOLE (BEIJING) TECHNOLOGY CO., LTD., Beijing (CN)

(72) Inventors: Le Lin, Beijing (CN); Gang Yu, Beijing (CN); Qi Yin, Beijing (CN)

(73) Assignees: BEIJING KUANGSHI TECHNOLOGY CO., LTD., Beijing (CN); PINHOLE (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 15/378,880

(22) Filed: Dec. 14, 2016

(65) Prior Publication Data

US 2017/0330333 A1    Nov. 16, 2017

(30) Foreign Application Priority Data

May 16, 2016 (CN) .......................... 2016 1 0323389

(51) Int. Cl.
G06T 7/00 (2017.01)
G06T 7/246 (2017.01)

(52) U.S. Cl.
CPC .... G06T 7/246 (2017.01); *G06T 2207/10016* (2013.01); *G06T 2207/30196* (2013.01); *G06T 2207/30241* (2013.01)

(58) Field of Classification Search
None
See application file for complete search history.

(56) References Cited

U.S. PATENT DOCUMENTS

| 2004/0101162 | A1* | 5/2004 | Higaki | G01C 11/00 382/103 |
| 2009/0257680 | A1* | 10/2009 | Dhand | G06T 3/4038 382/284 |
| 2013/0135524 | A1* | 5/2013 | Chang | H04N 5/145 348/441 |
| 2014/0376768 | A1* | 12/2014 | Troy | G01S 17/46 382/103 |
| 2017/0163997 | A1* | 6/2017 | Haruna | H04N 19/167 |

* cited by examiner

*Primary Examiner* — Delomia L Gilliard
(74) *Attorney, Agent, or Firm* — Hamre, Schumann, Mueller & Larson, P.C.

(57) ABSTRACT

A method and apparatus for detecting a movement direction of a target object are provided. The method comprises: acquiring a video sequence of the target object, and determining positions of the target object in a plurality of image frames of the video sequence; setting a plurality of base vectors within a coverage range of an image collection apparatus capturing the video sequence, wherein an angle between each of the base vectors and a reference vector set according to a specific scene being captured satisfies a predetermined condition; for each of the base vectors, determining a movement direction of the target object between each pair of adjacent image frames with respect to the base vector, and determining a general movement direction of the target object with respect to the base vector thereby; determining a movement direction of the target object according to the general movement directions of the target object.

19 Claims, 3 Drawing Sheets

METHOD AND APPARATUS FOR DETECTING MOVEMENT DIRECTION OF TARGET OBJECT

PRIORITY CLAIM

The present disclosure claims priority of a Chinese patent application No. 201610323389.2 with title of "METHOD AND APPARATUS FOR DETECTING MOVEMENT DIRECTION OF TARGET OBJECT" submitted by the present applicant on May 16, 2016 in China, which is hereby incorporated by reference in its entirety.

TECHNICAL FIELD OF THE DISCLOSURE

The present disclosure generally relates to the field of computer vision, and particularly to a method and apparatus for detecting a movement direction of a target object.

BACKGROUND

Passenger flow statistics based on flow directions of persons is very important for commercial places, such as shopping malls, supermarkets and the like, to understand and adjust their business strategies. At present, a method for detecting a flow direction of a person usually sets at the entrance region of a commercial place a single image acquisition apparatus and presets a straight line therein, and then judges the flow direction of the person according to whether and in which direction the person passes through the straight line. However, in accordance with such detection method, when the movement trajectory of the person to be detected (i.e. the target object) is not regular, it is very easy to yield false negatives or false positives. On the other hand, when a commercial place is an irregular site, it may not be able to simply decide whether a person to be detected enters the commercial place or not by setting a straight line in a single image acquisition apparatus. For example, it is assumed that a certain commercial place is located on both the left and right sides of a crossroads, then turning left and turning right at the crossroads may both lead to entering the commercial place. At this point, presetting a straight line in a single image acquisition apparatus fails to detect all persons entering the commercial place.

SUMMARY

The present disclosure is proposed in view of the above problems.

According to one aspect of the present disclosure, there is provided a method for detecting a movement direction of a target object, the method comprising: acquiring a video sequence of the target object, and determining positions of the target object in a plurality of image frames of the video sequence; setting a plurality of base vectors within a coverage range of an image collection apparatus capturing the video sequence, wherein an angle between each of the base vectors and a reference vector set according to a specific scene being captured satisfies a predetermined condition; for each of the base vectors, determining a movement direction of the target object between each pair of adjacent image frames with respect to the base vector according to the positions of the target object in the plurality of image frames, and determining a general movement direction of the target object with respect to the base vector according to movement directions of the target object between respective pairs of adjacent image frames with respect to the base vector; and determining a movement direction of the target object according to the general movement directions of the target object with respect to respective base vectors.

According to another aspect of the present disclosure, there is provided an apparatus for detecting a movement direction of a target object, the apparatus comprising: a positioning section configured to acquire a video sequence of the target object, and to determine positions of the target object in a plurality of image frames of the video sequence; a setting section configured to set a plurality of base vectors within a coverage range of an image collection apparatus capturing the video sequence, wherein an angle between each of the base vectors and a reference vector set according to a specific scene being captured satisfies a predetermined condition; an orientation section configured to, for each of the base vectors, determine a movement direction of the target object between each pair of adjacent image frames with respect to the base vector according to the positions of the target object in the plurality of image frames, and to determine a general movement direction of the target object with respect to the base vector according to movement directions of the target object between respective pairs of adjacent image frames with respect to the base vector; and a detection section configured to determine a movement direction of the target object according to the general movement directions of the target object with respect to respective base vectors.

According to a further aspect of the present disclosure, there is provided an apparatus for detecting a movement direction of a target object, the apparatus comprising: a processor; a memory; and a computer program instruction stored in the memory. The computer program instruction, when run by the processor, causes the apparatus for detecting the movement direction of the target object to perform steps of: acquiring a video sequence of the target object, and determining positions of the target object in a plurality of image frames of the video sequence; setting a plurality of base vectors within a coverage range of an image collection apparatus capturing the video sequence, wherein an angle between each of the base vectors and a reference vector set according to a specific scene being captured satisfies a predetermined condition; for each of the base vectors, determining a movement direction of the target object between each pair of adjacent image frames with respect to the base vector according to the positions of the target object in the plurality of image frames, and determining a general movement direction of the target object with respect to the base vector according to movement directions of the target object between respective pairs of adjacent image frames with respect to the base vector; and determining a movement direction of the target object according to the general movement directions of the target object with respect to respective base vectors.

According to still another aspect of the present disclosure, there is provided a computer program product for detecting a movement direction of a target object, the product comprising a computer readable storage medium storing thereon a computer program instruction which may be executed by a processor to cause the processor to: acquire a video sequence of the target object, and determine positions of the target object in a plurality of image frames of the video sequence; set a plurality of base vectors within a coverage range of an image collection apparatus capturing the video sequence, wherein an angle between each of the base vectors and a reference vector set according to a specific scene being captured satisfies a predetermined condition; for each of the base vectors, determine a movement direction of the target object between each pair of adjacent image frames with respect to the base vector according to the positions of the target object in the plurality of image frames, and determine a general movement direction of the target object with respect to the base vector according to movement directions of the target object between respective pairs of adjacent image frames with respect to the base vector; and determine a movement direction of the target object according to the general movement directions of the target object with respect to respective base vectors.

The method, apparatus and computer program product for detecting a movement direction of a target object according to the present disclosure set multiple reference vectors based on a specific scene to detect the movement direction of the target object, and can thus detect the movement direction of the target object accurately and accordingly improve the accuracy of the customer flow statistics.

BRIEF DESCRIPTION OF THE DRAWINGS

The above and other objects, features and advantages of the present disclosure will become more apparent through the more detailed description of embodiments of the present disclosure in conjunction with the attached drawings. The attached drawings are used for providing further understanding of the embodiments of the present disclosure, constitute a part of the specification, and are used for explaining the present disclosure together with the embodiments of the present disclosure, but do not limit the present disclosure. In the attached drawings, same reference numbers usually represent same components or steps.

DETAILED DESCRIPTION

In order to make the purpose, technical solution and advantage of the present disclosure obvious, a detailed description of the embodiments of the present disclosure will be given below with reference to the drawings of the embodiments. Obviously, the embodiments described herein are only part of, but not all of, the embodiments of the present disclosure. It is understood that the present disclosure should not be restricted by the exemplary embodiments described here. All the other embodiments which are made by those skilled in the art based on the embodiments of the present disclosure without any creative effort should fall into the protection range of the present disclosure.

Figure 1:
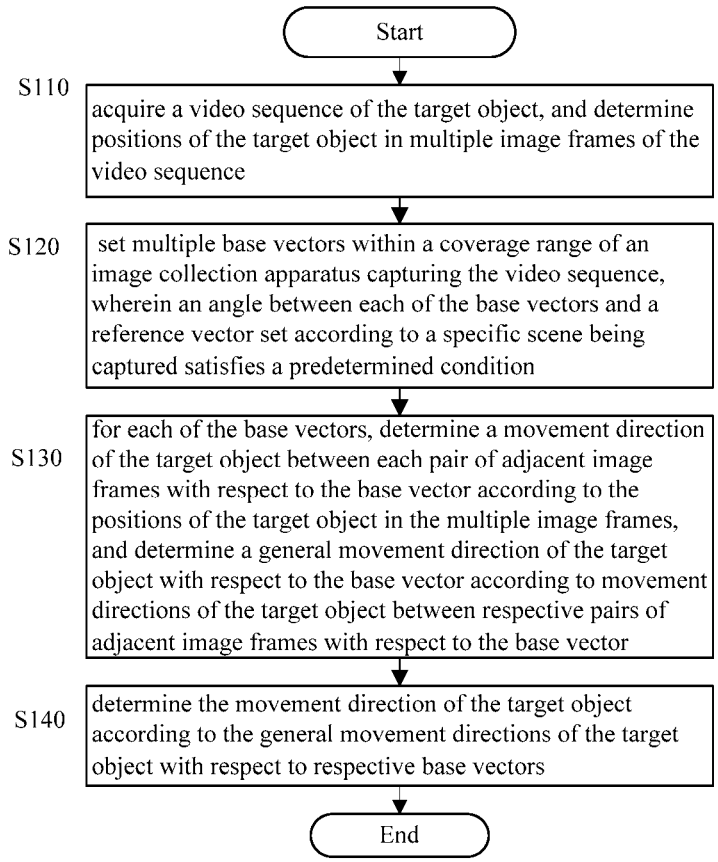
FIG. 1 schematically shows a flow chart of a method for detecting a movement direction of a target object according to an embodiment of the present disclosure.

In the following, the method for detecting a movement direction of a target object according to an embodiment of the present disclosure will be described in details with reference to FIG. 1. FIG. 1 schematically shows a flow chart of a method for detecting a movement direction of a target object according to an embodiment of the present disclosure.

As shown in FIG. 1, at step S110, a video sequence of the target object (e.g., a person to be detected) is acquired, and positions of the target object in multiple image frames of the video sequence are determined.

The video sequence including the target object may be captured by various image collection apparatus such as a stereo camera, a multi-lens camera, an ordinary camera, etc. Taking employing a stereo camera as an example, in the step, for a captured depth video, the size, shape and position of a target object may be determined in image frames containing the target object by various common object detection methods in the art such as template matching, SVM (Support Vector Machine), neutral network, etc., and then the target object is tracked based on the color information, local features, movement information or the like of the target object, thus the video sequence containing the target object in the video and the positions, which may be expressed by two dimensional coordinate points of the target object, of the target object in multiple image frames of the video sequence can be determined.

The multiple image frames are not necessary to be all the image frames in the video sequence, instead, may be only a part of the image frames; on the other hand, the multiple image frames may be continuous multiple image frames, or may be discontinuous multiple image frames extracted from the video sequence at a predetermined frame interval. In addition, it should be appreciated that the object detection and the object tracking on the acquired video sequence cannot be performed at an accuracy of 100%. For example, even if the object stays still, a jitter in a small range may occur in the position points detected by the object detection method. For example, in the process of object tracking and detection, a non-object area may be recognized as the target object in a short period of several frames or dozens of frames. In order to eliminate the above errors, in one example, the number of the multiple image frames needs to be greater than 15; in another example, the distance between the starting point of and the corresponding ending point of the target object needs to be greater than 100 pixels, otherwise, the acquired video sequence is considered as not conforming to requirements.

At step 120, multiple base vectors is set within a coverage range of an image collection apparatus capturing the video sequence, in which an angle between each of the base vectors and a reference vector set according to a specific scene being captured satisfies a predetermined condition.

The multiple base vectors may be set according to a specific scene captured. In the following, base vectors for some typical scenes will be described in conjunction with attached drawings.

Figure 2:
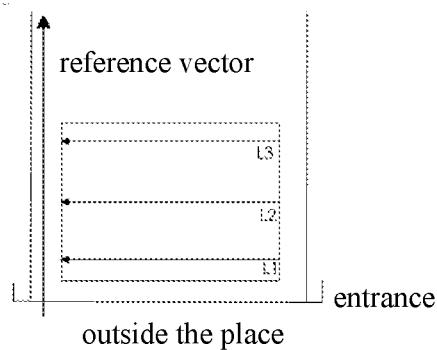
FIG. 2 illustrates an exemplary setting mode for base vectors in a case that the specific scene is an entrance to a certain place.

FIG. 2 illustrates an exemplary setting mode for base vectors in a case that the specific scene is an entrance to a certain place. In the scene, it is desired to count the passenger flow entering the place. As shown in FIG. 2, the rectangle box in the figure is the coverage range of the image collection apparatus, and the coverage range is located adjacent to the entrance inside the place. The position of the image collection apparatus may be adjusted to make the coverage range as close as possible to the entrance to the place. In the example, three base vectors L1, L2 and L3 are set within the coverage range, each of the base vectors spanning across the coverage range. It can be understood that the number of base vectors is not necessary to be three, instead, only needs to be more than one. On the other hand, although the three base vectors shown in FIG. 2 are all parallel to the entrance and their directions are all directed from the right to the left, this is not necessary. Specifically, in the exemplary scene, it is only needed that the angle between each of the base vectors and a reference vector which is vertical to the entrance and extends along the direction of entering the place satisfies [90°−α, 90°+α], α being a preset angle and usually less than 10 degrees. It can be understood that each of the base vectors is vertical to the reference vector when α is at 0 degree, as shown in the exemplary scenario of FIG. 2.

Figure 3:
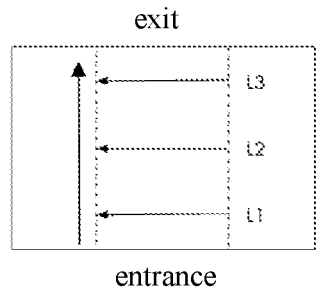
FIG. 3 illustrates an exemplary setting mode for base vectors in a case that the specific scene is a certain passageway under the camera coverage.

FIG. 3 illustrates an exemplary setting mode for base vectors in a case that the specific scene is a certain passageway within the coverage. In the scene, it is desired to count the passenger flows in both the forward and the backward directions of the passageway. As shown in FIG. 3, the rectangle box in the figure is the coverage of the image collection apparatus, and the dashed box represents the passageway. Hereinafter, for the convenience of description, it is assumed that the bottom of the dashed box is the entrance to the passageway and the top is the exit. In the example, three base vectors L1, L2 and L3 are set within the coverage, each of the base vectors spanning across the passageway. It can be understood that the number of base vectors is not necessary to be three, instead, only needs to be more than one. On the other hand, although the three base vectors shown in FIG. 3 are all vertical to the extending direction of the passageway and their directions are all directed from the right to the left, this is not necessary. Specifically, in the exemplary scene, it is only needed that the angle between each of the base vectors and a reference vector which is parallel to the passageway and is directed toward its exit from its entrance satisfies [90°−α, 90°+α], α being a preset angle and usually less than 10 degrees. It can be understood that each of the base vectors is vertical to the reference vector when α is at 0 degree, as shown in the exemplary scenario of FIG. 3.

Figure 4:
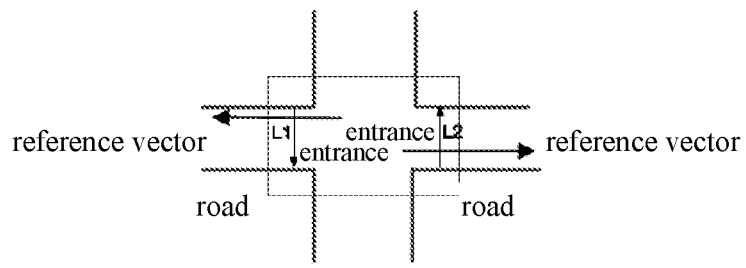
FIG. 4 illustrates an exemplary setting mode for base vectors in a case that the specific scene is multiple roads for multiple entrances for entering a certain place.

FIG. 4 illustrates an exemplary setting mode for base vectors in a case that the specific scene is multiple roads for multiple entrances for entering a certain place. In the scene, multiple roads all lead to the place. Thus, it is desired to count a general passenger flows for entering the place through entrances on respective roads. As shown in FIG. 4, the rectangle box in the figure is the coverage of the image collection apparatus, and the coverage covers two roads for entering two entrances respectively. In the example, base vectors L1 and L2 are set on each road adjacent to its corresponding entrance, and each of the base vectors spanning across the road. It can be understood that the number of roads may be more than two and the number of base vectors set on each road adjacent to its respective entrance may be more than one. In addition, multiple entrances to the place are not necessary to be located at opposite sides, instead, may also be located at a same side. On the other hand, although respective base vectors shown in FIG. 4 are all parallel to the corresponding entrances and their directions are all directed from the right to the left when facing the entrance, this is not necessary. Specifically, in the exemplary scene, it is only needed that the angle between each of the base vectors and a reference vector which is vertical to the corresponding entrance and extends along the direction of entering the place satisfies [90°−α, 90°+α], α being a preset angle and usually less than 10 degrees. It can be understood that each of the base vectors is vertical to the reference vector when α is at 0 degree, as shown in the exemplary scenario of FIG. 4.

Examples of base vector setting for some typical scenes are described in conjunction with FIGS. 2-4 in the above. For other scenes, base vectors suitable for the scenes may be set similarly. Specifically, reference vectors suitable for the scenes may be set, and then respective base vectors may be set in a manner such that the angles between the base vectors and the reference vectors satisfy predetermined conditions, and movement directions of the target object in respective scenes may be determined based on movement directions of the target object with respective to respective base vectors.

Back to FIG. 1, at step S130, for each of the base vectors, a movement direction of the target object between each pair of adjacent image frames with respect to the base vector is determined according to the positions of the target object in the multiple image frames, and a general movement direction of the target object with respect to the base vector is determined according to movement directions of the target object between respective pairs of adjacent image frames with respect to the base vector.

In this step, for each of the base vectors set in step S120, the movement direction of the target object between each pair of adjacent image frames in the multiple image frames with respect to the base vector is determined firstly. In the following, an exemplary determination manner will be described in conjunction with FIG. 5.

Figure 5:
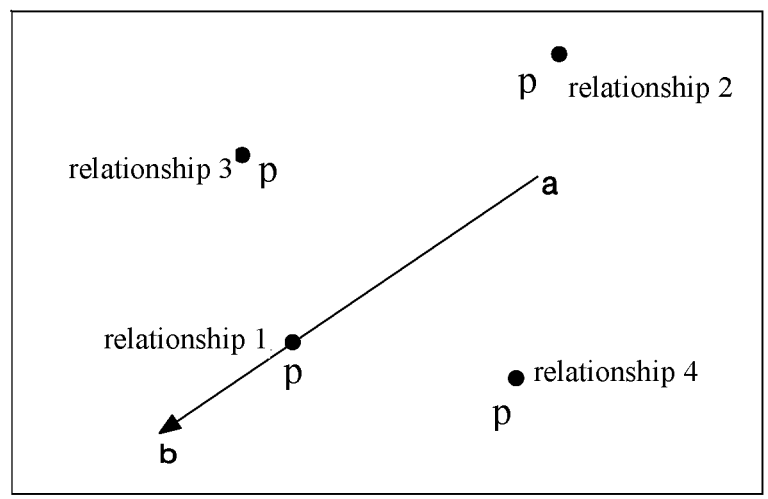
FIG. 5 shows a schematic diagram of possible position relationships of a point with respect to a vector.

FIG. 5 shows possible position relationships of a point p with respect to a vector ab. As shown in FIG. 5, there are four possible position relationships of the point p with respect to the vector ab: relationship 1, point p is on vector ab; relationship 2, the projection of point p to vector ab is outside vector ab; relationship 3, the projection of point p to vector ab is on vector ab and the angle between ap and ab along the clockwise direction is greater than 90 degrees; relationship 4, the projection of point p to vector ab is on vector ab and the angle between ap and ab along the clockwise direction is not greater than 90 degrees. Based on the possible position relationships of the point with respect to the vector as described above, in this step, the movement direction of the target object between any pair of adjacent image frames with respect to a base vector may be determined according to the positions of the target object in the image frames. Specifically, assuming that positions of the target object in the previous frame and the latter frame in a pair of adjacent image frames are respectively p and p', and the base vector is ab, the movement direction of the target object between the pair of adjacent image frames with respect to base vector ab may be determined by the following processes:

(i) determining a first angle between line ap connecting position p of the target object in the previous frame in the pair of adjacent image frames and the starting point of base vector ab and the base vector along a clockwise direction;

(ii) determining a second angle between line ap' connecting position p' of the target object in the latter frame in the pair of adjacent image frames and the starting point of base vector ab and the base vector along the clockwise direction;

(iii) determining that the movement direction of the target object between the pair of adjacent image frames with respect to the base vector is a first movement direction, if the projection of position p of the target object in the previous frame with respect to base vector ab is on base vector ab and the first angle is not greater than 90 degrees (i.e. the position relationship of position p with respect to base vector ab is relationship 4 as described above with reference to FIG. 5) as well as the projection of position p' of the target object in the latter frame with respect to base vector ab is on base vector ab and the second angle is greater than 90 degrees (i.e. the position relationship of position p' with respect to base vector ab is relationship 3 as described above with reference to FIG. 5);

determining that the movement direction of the target object between the pair of adjacent image frames with respect to the base vector is a second movement direction different from the first movement direction, if the projection of position p of the target object in the previous frame with respect to base vector ab is on base vector ab and the first angle is greater than 90 degrees (i.e. the position relationship of position p with respect to base vector ab is relationship 3 as described above with reference to FIG. 5) as well as the projection of position p' of the target object in the latter frame with respect to base vector ab is on base vector ab and the second angle is not greater than 90 degrees (i.e. the position relationship of position p' with respect to base vector ab is relationship 4 as described above with reference to FIG. 5).

As for a certain base vector, after the movement direction of the target object between each pair of adjacent image frames in the multiple image frames with respect to the base vector is determined as described above, a general movement direction of the target object with respect to this base vector may be further determined based on these determination results. Specifically, the number of the movement directions of the target object between respective pairs of adjacent image frames with respect to the base vector being the first movement direction as well as the number of the movement directions being the second movement direction may be counted; if the difference obtained by subtracting the number of the second movement directions from the number of the first movement directions is greater than or equal to 1, it is determined that the general movement direction is the first movement direction, and if the difference obtained by subtracting the number of the first movement directions from the number of the second movement directions is greater than or equal to 1, it is determined that the general movement direction is the second movement direction.

Figure 6:
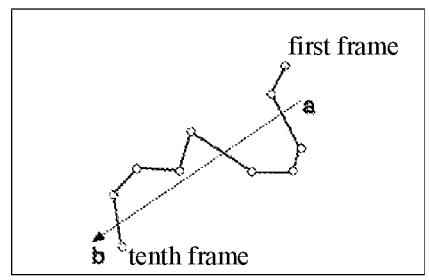
FIG. 6 illustrates a schematic diagram of positions of a target object with respect to a vector in multiple frames.

In the following, the process of step S130 will be further described by way of a specific and non-limiting example in conjunction with FIG. 6. As shown in FIG. 6, assuming that the number of the multiple image frames is 10 frames (for convenience of explanation, 10 frames are taken as an example here, it should be understood that the number of 10 frames is only one example but does not limit the present disclosure in any way), respective small circles in the figure represents positions of the target object in respective image frames, and ab is a base vector. According to the way as described above, it can be seen that, in a first pair of adjacent image frames, position relationship of the target object in the first frame with respect to ab is relationship 4, position relationship of the target object in the second frame with respect to ab is relationship 3, thereby it may be determined that the movement direction of the target object between the adjacent image frames of the first pair with respect to ab is the first movement direction. Similarly, the movement direction of the target object between each of other pairs of adjacent image frames (that is, from the second pair of adjacent image frames to the ninth pair of adjacent image frames) with respect to ab may be determined. Specifically, for the example scenario shown in FIG. 6, it may be determined that movement directions of the target object between the first and eighth pairs of adjacent image frames with respect to the base vector are the first movement directions, and that the movement direction of the target object between the fifth pair of adjacent image frames with respect to the base vector is the second movement direction. Therefore, it can be seen that the number of first movement directions is 2 and the number of second movement directions is 1. Thus, it can be determined that the general movement direction of the target object with respect to base vector ab is the first movement direction.

At step S140, the movement direction of the target object is determined according to the general movement directions of the target object with respect to respective base vectors.

In the step, the overall movement direction of the target object may be determined according to the general movement directions of the target object with respect to respective base vectors determined in step S130. In the following, the process in this step will be explained by taking typical scenes show in FIGS. 2-4 as examples again.

For the scene of an entrance to a certain place as shown in FIG. 2, as described above, each base vector in the scene is set such that the angle between the base vector and the reference vector which is vertical to the entrance and extends along the direction of entering the place satisfies [90°−α, 90°+α]. It can be understood that, if each base vector is set such that the angle between the base vector and the reference vector along the clockwise direction is [90°−α, 90°+α], that is, each base vector is roughly in the direction as shown in FIG. 2, it can be determined that the movement direction of the target object is the direction of entering the place as long as the general movement direction of the target object with respect to at least one of multiple base vectors is the first movement direction; and if the angle between each base vector and the reference vector along the anticlockwise direction is [90°−α, 90°+α], that is, each base vector is roughly in the direction opposite to the direction as shown in FIG. 2, it can be determined that the movement direction of the target object is the direction of entering the place as long as the general movement direction of the target object with respect to at least one of multiple base vectors is the second movement direction. Thereby, the passenger flow for entering the place as shown in FIG. 2 may be counted accurately.

For the scene of a certain passageway within the coverage as shown in FIG. 3, as described above, each base vector in the scene is set such that the angle between the base vector and the reference vector which is parallel to the passageway and is directed toward its exit from its entrance satisfies [90°−α, 90°+α]. It can be understood that, if the angle between each base vector and the reference vector along the clockwise direction is [90°−α, 90°+α], that is, each base vector is roughly in the direction as shown in FIG. 3, it can be determined that the movement direction of the target object is moving from the entrance toward the exit of the passageway when the general movement direction of the target object with respect to each base vector is the first movement direction, and it can be determined that the movement direction of the target object is moving from the exit toward the entrance of the passageway when the general movement direction of the target object with respect to each base vector is the second movement direction; and if the angle between each base vector and the reference vector along the anticlockwise direction is [90°−α, 90°+α], that is, each base vector is roughly in the direction opposite to the direction as shown in FIG. 3, it can be determined that the movement direction of the target object is moving from the exit toward the entrance of the passageway when the general movement direction of the target object with respect to each base vector is the first movement direction, and it can be determined that the movement direction of the target object is moving from the entrance toward the exit of the passageway when the general movement direction of the target object with respect to each base vector is the second movement direction. Thereby, passenger flows in both the forward and the backward directions of the passageway may be counted accurately.

For the scene of multiple roads for multiple entrances for entering a certain place as shown in FIG. 4, as described above, each base vector in the scene is set such that the angle between the base vector and the reference vector which is vertical to the entrance and extends along the direction of entering the place satisfies [90°−α, 90°+α]. It can be understood that, if the angle between each base vector and the reference vector along the clockwise direction is [90°−α, 90°+α], that is, each base vector roughly meets the direction as shown in FIG. 4, it can be determined that the movement direction of the target object is the direction of entering the place as long as the general movement direction of the target object with respect to at least one of multiple base vectors is the first movement direction; and if the angle between each base vector and the reference vector along the anticlockwise direction is [90°−α, 90°+α], it can be determined that the movement direction of the target object is the direction of entering the place as long as the general movement direction of the target object with respect to at least one of multiple base vectors is the second movement direction. Thereby, a total passenger flow for entering the place as shown in FIG. 4 through entrances on respective roads may be counted accurately.

The process in step S140 is explained in conjunction with typical scenes as shown in FIGS. 2-4 in the above. For other scenes, similarly, the movement direction of the target object may be determined according to the general movement directions of the target object with respect to respective base vectors determined at step S130.

In the above, the method for detecting the movement direction of a target object according to the embodiment of the present disclosure has been described. In the method, multiple base vectors are set based on the specific scene to detect the movement direction of the target object, thus the movement direction of the target object may be detected accurately, and further the accuracy of the passenger flow statistics may be improved.

Figure 7:
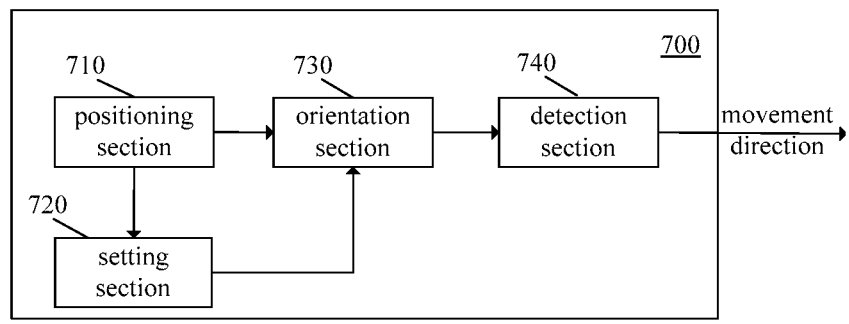
FIG. 7 shows an exemplary structural block diagram of an apparatus for detecting a movement direction of a target object according to an embodiment of the present disclosure.

In the following, an apparatus for detecting the movement direction of a target object according to an embodiment of the present disclosure will be described with reference to FIG. 7. FIG. 7 shows an exemplary structural block diagram of an apparatus 700 for detecting the movement direction of a target object according to an embodiment of the present disclosure. As shown in FIG. 7, the apparatus 700 for detecting the movement direction of a target object may include a positioning section 710, a setting section 720, an orientation section 730 and a detection section 740. Respective sections may execute respective steps/functions of the method for detecting the movement direction of a target object as described above in conjunction with FIGS. 1-6 respectively. Only main functions of respective sections of the apparatus 700 for detecting the movement direction of a target object will be described below and detailed contents already described in the above will be omitted.

The positioning section 710 acquires a video sequence of the target object, and determines positions of the target object in multiple image frames of the video sequence.

The video sequence including the target object may be captured by various image collection apparatus such as a stereo camera, a multi-lens camera, an ordinary camera, etc. Taking employing a stereo camera as an example, for a captured depth video, the positioning section 710 may determine the size, shape and position of a target object in image frames containing the target object by various object detection methods, and then track the target object, thus the video sequence containing the target object in the video and the positions, which may be expressed by two dimensional coordinate points of the target object, of the target object in multiple image frames of the video sequence can be determined.

The multiple image frames are not necessary to be all the image frames in the video sequence, instead, may be only a part of the image frames; on the other hand, the multiple image frames may be continuous multiple image frames, or may be discontinuous multiple image frames extracted from the video sequence at a predetermined frame interval.

The setting section 720 set multiple base vectors within a coverage range of an image collection apparatus capturing the video sequence, wherein an angle between each of the base vectors and a reference vector set according to a specific scene being captured satisfies a predetermined condition.

The multiple base vectors will be set according to the specific scene captured. Settings of base vectors for several typical scenes have been described in conjunction with FIGS. 2-4 hereinabove and will not be described in details here. In a word, the setting section 720 will set reference vectors suitable for various different scenes according to the scenes, and then set multiple base vectors such that the angles between the base vectors and the reference vectors satisfy predetermined conditions, and movement directions of the target object in respective scenes may be determined based on movement directions of the target object with respective to respective base vectors.

The orientation section 730 determines, for each of the base vectors, a movement direction of the target object between each pair of adjacent image frames with respect to the base vector according to the positions of the target object in the multiple image frames, and determines a general movement direction of the target object with respect to the base vector according to movement directions of the target object between respective pairs of adjacent image frames with respect to the base vector.

For each of the base vectors set by the setting section 720, the orientation section 730 firstly determines the movement direction of the target object between each pair of adjacent image frames in the multiple image frames with respect to the base vector.

As describe above in conjunction with FIG. 5, there are four possible position relationships of a point p with respect to a vector ab. Based on such possible position relationships, the orientation section 730 can determine the movement direction of the target object between any pair of adjacent image frames with respect to a base vector according to the positions of the target object in the image frames. Specifically, assuming that positions of the target object in the previous frame and the latter frame in a pair of adjacent image frames are respectively p and p', and the base vector is ab, the orientation section 730 may determine the movement direction of the target object between the pair of adjacent image frames with respect to base vector ab by:

(i) determining a first angle between line ap connecting position p of the target object in the previous frame in the pair of adjacent image frames and the starting point of base vector ab and the base vector along a clockwise direction;

(ii) determining a second angle between line ap' connecting position p' of the target object in the latter frame in the pair of adjacent image frames and the starting point of base vector ab and the base vector along the clockwise direction;

(iii) determining that the movement direction of the target object between the adjacent image frames of the pair with respect to the base vector is a first movement direction, if the projection of position p of the target object in the previous frame with respect to base vector ab is on base vector ab and the first angle is not greater than 90 degrees as well as the projection of position p' of the target object in the latter frame with respect to base vector ab is on base vector ab and the second angle is greater than 90 degrees;

determining that the movement direction of the target object between the adjacent image frames of the pair with respect to the base vector is a second movement direction different from the first movement direction, if the projection of position p of the target object in the previous frame with respect to base vector ab is on base vector ab and the first angle is greater than 90 degrees as well as the projection of position p' of the target object in the latter frame with respect to base vector ab is on base vector ab and the second angle is not greater than 90 degrees.

After determining, for a certain base vector, the movement direction of the target object between each pair of adjacent image frames in the multiple image frames with respect to this base vector as described above, the orientation section 730 can further determine a general movement direction of the target object with respect to the base vector based on these determination results. Specifically, the orientation section 730 counts the number of the movement directions of the target object between respective pairs of adjacent image frames with respect to the base vector being the first movement direction as well as the number of the movement directions being the second movement direction; determines that the general movement direction is the first movement direction if the difference obtained by subtracting the number of the second movement directions from the number of the first movement directions is greater than or equal to 1, and determines that the general movement direction is the second movement direction if the difference obtained by subtracting the number of the first movement directions from the number of the second movement directions is greater than or equal to 1.

The detection section 740 determines the movement direction of the target object according to the general movement directions of the target object with respect to respective base vectors determined by the orientation section 730.

For example, for the scene of an entrance to a certain place as shown in FIG. 2, if the setting section 720 sets multiple base vectors such that the angle between each of the base vectors and the reference vector along the clockwise direction is [90°−α, 90°+α], the detection section 740 determines that the movement direction of the target object is the direction of entering the place as long as the general movement direction of the target object with respect to at least one of multiple base vectors is the first movement direction; and if the setting section 720 sets multiple base vectors such that the angle between each of the base vectors and the reference vector along the anticlockwise direction is [90°−α, 90°+α], the detection section 740 determines that the movement direction of the target object is the direction of entering the place as long as the general movement direction of the target object with respect to at least one of multiple base vectors is the second movement direction. Thereby, the passenger flow for entering the place as shown in FIG. 2 may be counted accurately.

As another example, for the scene of a certain passageway within the coverage as shown in FIG. 3, if the setting section 720 sets multiple base vectors such that the angle between each of the base vectors and the reference vector along the clockwise direction is [90°−α, 90°+α], the detection section 740 determines that the movement direction of the target object is moving from the entrance toward the exit of the passageway when the general movement direction of the target object with respect to each base vector is the first movement direction, and the detection section 740 determines that the movement direction of the target object is moving from the exit toward the entrance of the passageway when the general movement direction of the target object with respect to each base vector is the second movement direction; and if the setting section 720 sets multiple base vectors such that the angle between each of the base vectors and the reference vector along the anticlockwise direction is [90°−α, 90°+α], the detection section 740 determines that the movement direction of the target object is moving from the exit toward the entrance of the passageway when the general movement direction of the target object with respect to each base vector is the first movement direction, and the detection section 740 determines that the movement direction of the target object is moving from the entrance toward the exit of the passageway when the general movement direction of the target object with respect to each base vector is the second movement direction. Thereby, passenger flows in both the forward and the backward directions of the passageway may be counted accurately.

As another example, for the scene of multiple roads for multiple entrances for entering a certain place as shown in FIG. 4, if the setting section 720 sets multiple base vectors such that the angle between each of the base vectors and the reference vector along the clockwise direction is [90°−α, 90°+α], the detection section 740 determines that the movement direction of the target object is the direction of entering the place as long as the general movement direction of the target object with respect to at least one of multiple base vectors is the first movement direction; and if the setting section 720 sets multiple base vectors such that the angle between each of the base vectors and the reference vector along the anticlockwise direction is [90°−α, 90°+α], the detection section 740 determines that the movement direction of the target object is the direction of entering the place as long as the general movement direction of the target object with respect to at least one of multiple base vectors is the second movement direction. Thereby, a total passenger flow for entering the place as shown in FIG. 4 through entrances on respective roads may be counted accurately.

The process of the detection section 740 is explained in conjunction with typical scenes as shown in FIGS. 2-4 in the above. For other scenes, similarly, the detection section 740 may determine the movement direction of the target object according to the general movement directions of the target object with respect to respective base vectors determined by the orientation section 730.

In the above, the apparatus 700 for detecting the movement direction of a target object according to the embodiment of the present disclosure has been described in conjunction with attached drawings. The apparatus sets multiple base vectors based on the specific scene to detect the movement direction of the target object, thus the movement direction of the target object may be detected accurately, and further the accuracy of the passenger flow statistics may be improved.

In the following, an exemplary block diagram of a computing device which may be used for implementing the apparatus for detecting the movement direction of a target object of the embodiment of the present disclosure is described with reference to FIG. 8. The computing device may be a computer or server which is equipped with an image collection apparatus.

Figure 8:
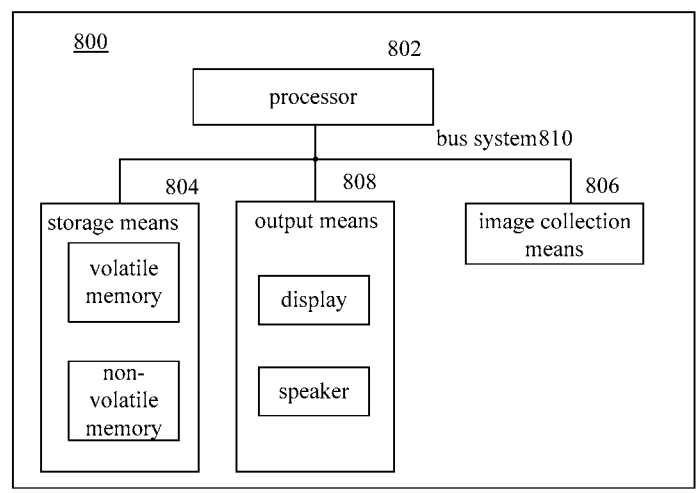
FIG. 8 shows a block diagram of a computing device for implementing an exemplary apparatus for detecting a movement direction of a target object according to an embodiment of the present disclosure.

As shown in FIG. 8, the computing device 800 includes one or more processors 802, storage means 804, image collection means 806 and output means 808, and such components are interconnected via a bus system 810 and/or connection mechanisms in other forms (not shown). It should be noted that components and structure of the computing device 800 shown in FIG. 8 are only illustrative but not limiting, and that the computing device 800 may also have other components and structures as desired.

The processor 802 may be a Central Processing Unit (CPU) or a processing unit in other form having a data processing capability and/or an instruction execution capability, and may control other components in the computing device 800 to perform desired functions.

The storage means 804 may include one or more computer program products which may include computer readable storage media in various forms such as a volatile memory and/or a non-volatile memory. The volatile memory may include for example a Random Access Memory (RAM) and/or a cache, etc. The non-volatile memory may include for example a Read Only Memory (ROM), a hard disk, a flash memory, etc. One or more computer program instructions may be stored on the computer readable storage medium, and the processor 802 may run the program instructions so as to realize the functions of embodiments of the present disclosure as described above and/or other desired functions. The computer readable storage medium may further store therein various application programs and various data, such as respective base vectors, reference vectors, positions of the target object in image frames, the first angle, the second angle, movement directions of the target object between each pair of adjacent image frames with respect to base vectors, etc.

The image collection means 806 is used for capturing the video sequence containing the target object and storing the captured video in the storage means 804 for using by other components.

The output means 808 may output to the external (e.g. a user) various information such as image information, voice information and movement direction detection results and may include one or more of a display, a speaker, etc.

The basic principles of the present disclosure have been described above in conjunction with specific embodiments. However, it is to be noted that the advantage, predominance, effect and so on mentioned in the present disclosure are merely exemplary but not limiting, and should not be interpreted to be necessary for the embodiments of the present disclosure. In addition, the specific details are disclosed above only for the purpose of illustration and convenience of understanding but not for limitation. These details will not restrict the present disclosure to be implemented by employing these details necessarily.

The block diagrams of the devices, means, apparatus and system involved in the present disclosure are only illustrative examples and not intended to require or imply that they should be connected, arranged or configured in the manner shown in the diagrams. As will be realized by those skilled in the art, these devices, means, apparatus and system can be connected, arranged or configured in any way. The terms such as "including", "comprising", "having" or the like are open-meaning words, refer to "including but not limited to", and can be exchanged therewith. The terms of "or" and "and" used herein refer to "and/or" and can be exchanged therewith unless the context explicitly indicates not. The terms of "such as" used herein refer to "such as but not limited to" and can be exchanged therewith.

In addition, as used herein, the word of "or" used in the list of items beginning with "at least one of" indicates separate listing so that the list of for example "at least one of A, B or C" means A or B or C, AB or AC or BC, or ABC (that is, A and B and C). In addition, the term of "exemplary" does not indicate that the example in question is preferable or better than other examples.

It is also to be noted that in the device and method of the present disclosure, the parts or the steps can be divided and/or re-combined. The division and/or recombination should be considered as equivalent solutions of the present disclosure.

Various change, replacement or alternation to the techniques described herein can be made without departing from the techniques defined in the claims. In addition, the scope of the claims of the present disclosure is not limited to the specific aspects of process, machine, manufacturing, composition of event, measure, method and action as described above. The process, machine, manufacturing, composition of event, measure, method and action which are currently existing or to be developed in the future and can perform substantially the same function or achieve substantially the same effect as the corresponding aspect as described here can be employed. Therefore, such process, machine, manufacturing, composition of event, measure, method and action are within the scope of the appended claims.

The above description of the aspects of the present disclosure is provided to enable those skilled in the art to make or use the present disclosure. Various modifications to these aspects are obvious to those skilled in the art and the general principles defined here can be applied to other aspects without departing from the scope of the present disclosure. Therefore, the present disclosure is not intended to be restricted to the aspects disclosed here and should accord to the broadest scope consistent with the principles and novel features disclosed here.

The above description is given for the purpose of illustration and explanation. In addition, the description is not intended to restrict the embodiments of the present disclosure to the form disclosed here. Although multiple exemplary aspects and embodiments have been discussed, those skilled in the art can conceive of other alternation, modification, change, addition and sub-combination thereof.

What is claimed is:

1. A method for detecting a movement direction of a target object, the method comprising:
   acquiring a video sequence of the target object, and determining positions of the target object in a plurality of image frames of the video sequence;
   setting a plurality of base vectors within a coverage range of an image collection apparatus capturing the video sequence, wherein an angle between each of the base vectors and a reference vector set according to a specific scene being captured satisfies a predetermined condition;
   for each of the base vectors, determining a movement direction of the target object between each pair of adjacent image frames with respect to the base vector according to the positions of the target object in the plurality of image frames, and determining a movement direction of the target object with respect to the base vector according to movement directions of the target object between respective pairs of adjacent image frames with respect to the base vector; and determining a movement direction of the target object according to the movement directions of the target object with respect to respective base vectors.

2. The method for detecting the movement direction of a target object according to claim 1, wherein the plurality of image frames are a plurality of continuous image frames in the video sequence.

3. The method for detecting the movement direction of a target object according to claim 1, wherein the plurality of image frames are a plurality of image frames extracted from the video sequence at a predetermined frame interval.

4. The method for detecting the movement direction of a target object according to claim 1, wherein the step of for each of the base vectors, determining the movement direction of the target object between each pair of adjacent image frames with respect to the base vector according to the positions of the target object in the plurality of image frames comprises:

determining a first angle between a line connecting a position of the target object in a previous frame in a pair of adjacent image frames and a starting point of the base vector and the base vector along a clockwise direction;

determining a second angle between a line connecting a position of the target object in a latter frame in the pair of adjacent image frames and the starting point of the base vector and the base vector along the clockwise direction;

determining that the movement direction of the target object between the pair of adjacent image frames with respect to the base vector is a first movement direction, if a projection of the position of the target object in the previous frame with respect to the base vector is on the base vector and the first angle is not greater than 90 degrees as well as a projection of the position of the target object in the latter frame with respect to the base vector is on the base vector and the second angle is greater than 90 degrees; and determining that the movement direction of the target object between the pair of adjacent image frames with respect to the base vector is a second movement direction, if the projection of the position of the target object in the previous frame with respect to the base vector is on the base vector and the first angle is greater than 90 degrees as well as the projection of the position of the target object in the latter frame with respect to the base vector is on the base vector and the second angle is not greater than 90 degrees.

5. The method for detecting the movement direction of a target object according to claim 4, wherein the step of determining a movement direction of the target object with respect to the base vector according to movement directions of the target object between respective pairs of adjacent image frames with respect to the base vector comprises:

counting the number of the movement directions of the target object between respective pairs of adjacent image frames with respect to the base vector being the first movement directions;

counting the number of the movement directions of the target object between respective pairs of adjacent image frames with respect to the base vector being the second movement directions; and determining that the movement direction of the target object with respect to the base vector is the first movement direction if a difference obtained by subtracting the number of the second movement directions from the number of the first movement directions is greater than or equal to 1, and determining that the movement direction of the target object with respect to the base vector is the second movement direction if a difference obtained by subtracting the number of the first movement directions from the number of the second movement directions is greater than or equal to 1.

6. The method for detecting the movement direction of a target object according to claim 5, wherein the step of setting a plurality of base vectors within the coverage range of an image collection apparatus capturing the video sequence comprises:

in a case that the specific scene is an entrance to a certain place and the coverage range is an area adjacent to the entrance inside the place, setting the plurality of base vectors such that each of the base vectors spans across the area and an angle between each of the base vectors and the reference vector is [90°−α, 90°+α], wherein α is a predetermined angle and the reference vector is vertical to the entrance and extends along the direction of entering the place.

7. The method for detecting the movement direction of a target object according to claim 6, wherein α is less than 10 degrees.

8. The method for detecting the movement direction of a target object according to claim 6, wherein each of the base vectors is set such that the angle between each of the base vectors and the reference vector along the clockwise direction is [90°−α, 90°+α], and wherein the step of determining the movement direction of the target object according to the movement directions of the target object with respect to respective base vectors comprises:

determining that the movement direction of the target object is a direction of entering the place if the movement direction of the target object with respect to at least one base vector is the first movement direction.

9. The method for detecting the movement direction of a target object according to claim 6, wherein each of the base vectors is set such that the angle between each of the base vectors and the reference vector along the anticlockwise direction is [90°−α, 90°+α], and wherein the step of determining the movement direction of the target object according to the movement directions of the target object with respect to respective base vectors comprises:

determining that the movement direction of the target object is a direction of entering the place if the movement direction of the target object with respect to at least one base vector is the second movement direction.

10. The method for detecting the movement direction of a target object according to claim 5, wherein the step of setting a plurality of base vectors within the coverage range of an image collection apparatus capturing the video sequence comprises:

in a case that the specific scene is a certain passageway within the coverage range, setting the plurality of base vectors inside the passageway such that each of the base vectors spans across the passageway and an angle between each of the base vectors and the reference vector is [90°−α, 90°+α], wherein α is a predetermined angle and the reference vector is parallel to the passageway and is directed toward an exit of the passageway from an entrance of the passageway.

11. The method for detecting the movement direction of a target object according to claim 10, wherein α is less than 10 degrees.

12. The method for detecting the movement direction of a target object according to claim 10, wherein each of the base vectors is set such that the angle between each of the base vector and the reference vector along the clockwise direction is [90°−α, 90°+α], and wherein the step of determining the movement direction of the target object according to the movement directions of the target object with respect to respective base vectors comprises:

determining that the movement direction of the target object is moving from the entrance of the passageway toward the exit if the movement direction of the target object with respect to each of base vectors is the first movement direction; and determining that the movement direction of the target object is moving from the exit of the passageway toward the entrance if the movement direction of the target object with respect to each of base vectors is the second movement direction.

13. The method for detecting the movement direction of a target object according to claim 10, wherein each of the base vectors is set such that the angle between each of the base vector and the reference vector along the anticlockwise direction is [90°−α, 90°+α], and wherein the step of determining the movement direction of the target object according to the movement directions of the target object with respect to respective base vectors comprises:

determining that the movement direction of the target object is moving from the exit of the passageway toward the entrance if the movement direction of the target object with respect to each of base vectors is the first movement direction; and determining that the movement direction of the target object is moving from the entrance of the passageway toward the exit if the movement direction of the target object with respect to each of base vectors is the second movement direction.

14. The method for detecting the movement direction of a target object according to claim 5, wherein the step of setting a plurality of base vectors within the coverage range of an image collection apparatus capturing the video sequence comprises:

in a case that the specific scene is a plurality of roads for a plurality of entrances entering a certain place and the coverage range covers the plurality of roads, setting at least one base vector on each road adjacent to the respective entrance respectively such that each of the base vectors spans across the road and the angle between each of the base vectors and the reference vector is [90°−α, 90°+α], wherein α is a predetermined angle and the reference vector is vertical to the respective entrance and extends along a direction of entering the place.

15. The method for detecting the movement direction of a target object according to claim 14, wherein α is less than 10 degrees.

16. The method for detecting the movement direction of a target object according to claim 14, wherein each of the base vectors is set such that the angle between each of the base vector and the reference vector along the clockwise direction is [90°−α, 90°+α], and wherein the step of determining the movement direction of the target object according to the movement directions of the target object with respect to respective base vectors comprises:

determining that the movement direction of the target object is a direction of entering the place if the movement direction of the target object with respect to at least one base vector is the first movement direction.

17. The method for detecting the movement direction of a target object according to claim 14, wherein each of the base vectors is set such that the angle between each of the base vector and the reference vector along the anticlockwise direction is [90°−α, 90°+α], and wherein the step of determining the movement direction of the target object according to the movement directions of the target object with respect to respective base vectors comprises:

determining that the movement direction of the target object is a direction of entering the place if the movement direction of the target object with respect to at least one base vector is the second movement direction.

18. An apparatus for detecting a movement direction of a target object, the apparatus comprising:

a processor;

a memory; and a computer program instruction stored in the memory, which, when run by the processor, causes the apparatus for detecting the movement direction of the target object to perform steps of:

acquiring a video sequence of the target object, and determining positions of the target object in a plurality of image frames of the video sequence;

setting a plurality of base vectors within a coverage range of an image collection apparatus capturing the video sequence, wherein an angle between each of the base vectors and a reference vector set according to a specific scene being captured satisfies a predetermined condition;

for each of the base vectors, determining a movement direction of the target object between each pair of adjacent image frames with respect to the base vector according to the positions of the target object in the plurality of image frames, and determining a movement direction of the target object with respect to the base vector according to movement directions of the target object between respective pairs of adjacent image frames with respect to the base vector; and determining a movement direction of the target object according to the movement directions of the target object with respect to respective base vectors.

19. A non-transitory computer program product for detecting a movement direction of a target object, the non-transitory computer program product comprising:

a non-transitory computer readable storage medium storing thereon a computer program instruction which may be executed by a processor to cause the processor to:

acquire a video sequence of the target object, and determine positions of the target object in a plurality of image frames of the video sequence;

set a plurality of base vectors within a coverage range of an image collection apparatus capturing the video sequence, wherein an angle between each of the base vectors and a reference vector set according to a specific scene being captured satisfies a predetermined condition;

for each of the base vectors, determine a movement direction of the target object between each pair of adjacent image frames with respect to the base vector according to the positions of the target object in the plurality of image frames, and determine a movement direction of the target object with respect to the base vector according to movement directions of the target object between respective pairs of adjacent image frames with respect to the base vector; and determine a movement direction of the target object according to the movement directions of the target object with respect to respective base vectors.

* * * * *